United States Patent
Messina

(10) Patent No.: US 11,833,789 B2
(45) Date of Patent: Dec. 5, 2023

(54) BIODEGRADABLE AND COMPOSTABLE FILM WITH AN INCREASED BARRIER EFFECT TO AERIFORM FLUIDS

(71) Applicant: 3 MP HOLDING S.r.l., Rome (IT)

(72) Inventor: Sergio Messina, Rome (IT)

(73) Assignee: 3 MP HOLDING S.R.L., Rome (IT)

( * ) Notice: Subject to any disclaimer, the term of this patent is extended or adjusted under 35 U.S.C. 154(b) by 203 days.

(21) Appl. No.: 17/622,113

(22) PCT Filed: Sep. 6, 2019

(86) PCT No.: PCT/IT2019/000069
§ 371 (c)(1),
(2) Date: Dec. 22, 2021

(87) PCT Pub. No.: WO2021/024280
PCT Pub. Date: Feb. 11, 2021

(65) Prior Publication Data
US 2022/0363040 A1   Nov. 17, 2022

(30) Foreign Application Priority Data

Aug. 8, 2019   (IT) .......................... 102019000014403

(51) Int. Cl.
*B32B 27/08*   (2006.01)
*B32B 7/027*   (2019.01)
(Continued)

(52) U.S. Cl.
CPC .............. *B32B 27/08* (2013.01); *B32B 7/027* (2019.01); *B32B 7/12* (2013.01); *B32B 27/20* (2013.01);
(Continued)

(58) Field of Classification Search
CPC ....................................................... B32B 27/36
See application file for complete search history.

(56) References Cited

U.S. PATENT DOCUMENTS

2005/0182196 A1    8/2005 Khemani et al.
2020/0376822 A1*  12/2020 Loos ....................... B32B 27/36

FOREIGN PATENT DOCUMENTS

WO         2018/233888         12/2018

OTHER PUBLICATIONS

Basf, "ecoflex F Blend C1200", Jan. 1, 2013, pp. 1-3, XP055419682, Retrieved from the Internet: URL:https://www.plasticsportal.net/wa/EU/Catalog/ePlastics/doc4/BASF/product/ecoflex_f_blend_c1200/.pdf?assettype=pi/pdf&language=EN&urn=urn:documentum:eCommerce_sol_EU:09007bb28016fe27.pdf. [submission pending].

(Continued)

*Primary Examiner* — Zachary M Davis
(74) *Attorney, Agent, or Firm* — NIXON & VANDERHYE

(57) ABSTRACT

Disclosed is a biodegradable, compostable and thermoshrinking film for packaging perishable goods, including a base structure substantially permeable to light radiation and including a first layer 10 μm thick, to directly contact the goods, and consisting of 89% in weight Mater-Bi® EF51L, 10% in weight BioGranic™ 3112 and 1% in weight Mater-B® master MEE. A second layer, overlapping the first, has a thickness equal to the one of the first layer and consists of 50% in weight Mater-Bi® EF51L and 50% in weight Mater-Bi® DF51A0. A third layer, overlapping the second, has a thickness equal to the one of the first layer and consists of 99% in weight Mater-Bi® EF51L and 1% in weight Mater-Bi® master MEE. A barrier layer including aluminum and/or aluminum oxide and/or silicon oxide and having a thickness≤0.1 μm overlaps the third layer.

13 Claims, 1 Drawing Sheet

(51) Int. Cl.
     *B32B 7/12*           (2006.01)
     *B32B 27/20*         (2006.01)
     *B32B 27/36*         (2006.01)
     *B65D 65/40*        (2006.01)
     *B65D 65/46*        (2006.01)

(52) U.S. Cl.
     CPC .............. B32B 27/36 (2013.01); B65D 65/40 (2013.01); B65D 65/466 (2013.01); *B32B 2250/244* (2013.01); *B32B 2255/10* (2013.01); *B32B 2255/20* (2013.01); *B32B 2255/205* (2013.01); *B32B 2264/104* (2013.01); *B32B 2307/30* (2013.01); *B32B 2307/7163* (2013.01); *B32B 2307/72* (2013.01); *B32B 2307/732* (2013.01); *B32B 2307/75* (2013.01); *B32B 2439/70* (2013.01)

(56) References Cited

OTHER PUBLICATIONS

International Search Report for PCT/IT2019/000069 dated Mar. 26, 2020, 4 pages.
Written Opinion of the ISA for PCT/IT2019/000069 dated Mar. 26, 2020, 6 pages.

* cited by examiner

BIODEGRADABLE AND COMPOSTABLE FILM WITH AN INCREASED BARRIER EFFECT TO AERIFORM FLUIDS

This application is the U.S. national phase of International Application No. PCT/IT2019/000069 filed Sep. 6, 2019 which designated the U.S. and claims priority to Italian Patent Application No. 102019000014403 filed Aug. 8, 2019, the entire contents of each of which are hereby incorporated by reference.

FIELD OF APPLICATION OF THE INVENTION

The present invention relates to the field of packaging for perishable goods such as by way of example, food products.

Specifically, the present invention relates to packaging which has an increased barrier effect towards aeriform fluids, such as water vapor and atmospheric gases (e.g. nitrogen, oxygen and carbon dioxide). Here and in the continuation of the present description, the term "barrier effect" means the ability of a packaging to oppose a crossing thereof by agents such as fluids and radiation.

The present invention in particular relates to a film of the aforesaid type which in addition to having an increased barrier effect towards aeriform fluids and possibly light radiation, is biodegradable and compostable as set forth by Standard EN 13432 of the European Committee for Standardization (known also as "CEN").

Overview of the Prior Art

When packaged, food usually is inserted or wrapped in packaging with an increased barrier effect towards water vapor and atmospheric gases. Not only must said packaging to indeed preserve the fragrance of the food as best as possible, but also the softness of moist products and the crunchiness of dry products therein packaged, up to when the package is opened.

The current films having an increased barrier effect towards aeriform fluids and which can be used as packaging for perishable goods are made of non-biodegradable (and accordingly, non-compostable) plastic materials. By way of example, a film having an increased barrier effect towards oxygen and water vapor can be made by overlapping a layer of clear polypropylene over a layer of metallized polypropylene.

Given that the known films which can be used as packaging for perishable goods are not biodegradable, they have a significant environmental impact.

Objects of the Invention

It is the object of the present invention to overcome the aforesaid drawbacks by indicating a film which can be used as packaging for perishable goods which is both biodegradable and compostable as set out by Standard EN 13432 of the European Committee for Standardization.

Summary and Advantages of the Invention

The object of the present invention is a film for packaging perishable goods comprising:
a base structure which substantially is permeable to light radiation and including:
  a first layer, intended to come into direct contact with the good to be packaged, consisting of:
    a first biodegradable and compostable product as set out by Standard EN 13432 of the European Committee for Standardization,
    said first product, preferably Mater-Bi® EF51L, being a thermoplastic material:
      being processable by blowing extrusion,
      comprising polyester,
      having a density determined according to test ASTM D792 at 23° C., equal to 1.22 g/cm$^3$
    and
      having a melt mass flow index (also called "melt flow rate" or MFR) determined according to Standard ISO 1133-1, equal to 3.5 g/10 min at 190° C. and for 2.16 kg,
    said first product being present in said first layer in a quantity which is not less than 83.5% in weight and preferably equal to 89% in weight;
    a first biodegradable and compostable additive as set out by Standard EN 13432 of the European Committee for Standardization,
    said first additive, preferably BioGranic™ 3112, comprising 67% calcium carbonate in weight and 33% compostable resin in weight as set out by Standard EN 13432 of the European Committee for Standardization,
    said first additive having a density of 1.9 g/cm$^3$,
    said first additive being present in said first layer in a quantity between 5% in weight and 15% in weight, and preferably equal to 10% in weight;
    a second biodegradable and compostable additive as set out by Standard EN 13432 of the European Committee for Standardization,
    said second additive, preferably Mater-Bi® master MEE, having:
      a melting temperature determined according to test ASTM D3418, equal to 118° C.
    and
      a density determined according to test ASTM D792 at 23° C., equal to 1.18 g/cm$^3$,
    said second additive being present in said first layer in a quantity between 0.5% in weight and 1.5% in weight, and preferably equal to 1% in weight,
  said first layer having a thickness between 4 μm and 20 μm, preferably between 9 μm and 11 μm, and even more preferably equal to 10 μm;
  a second layer consisting of:
    said first product in a quantity between 40% in weight and 60% in weight, and preferably equal to 50% in weight;
    a second biodegradable and compostable product as set out by Standard EN 13432 of the European Committee for Standardization,
    said second product, preferably Mater-Bi® DF51A0, being a thermoplastic material:
      being processable by blowing extrusion,
      comprising polyester,
      having a density determined according to test ASTM D792 at 23° C., equal to 1.23 g/cm$^3$
    and
      having a melt mass flow index determined according to ASTM D1238, equal to 4 g/10 min at 190° C. and for 2.16 kg,
    said second product being present in said second layer in a quantity between 40% in weight and 60% in weight, and preferably equal to 50% in weight, said second layer overlapping said first layer and having a thickness which is almost equal to the one of said first layer (and thus preferably between 9 µm and 11 µm, and more preferably equal to 10 µm);
a third layer consisting of:
said first product in a quantity which is not less than 98.5% in weight, and preferably equal to 99% in weight;
said second additive in a quantity between 0.5% in weight and 1.5% in weight, and preferably equal to 1% in weight,
said third layer overlapping said second layer so that the latter is interposed between said first and third layers,
said third layer having a thickness which is almost equal to the one of said first layer (and thus preferably between 9 µm and 11 µm, and more preferably equal to 10 µm);
a barrier layer comprising aluminum and/or aluminum oxide and/or silicon oxide,
said barrier layer overlapping said third layer so that the latter is interposed between said second layer and said barrier layer,
said barrier layer having a thickness which is not greater than 0.1 µm.

So there is no misunderstanding, the products Mater-Bi® EF51L, Mater-Bi® master MEE and Mater-Bi® DF51A0 are known and, at the filing date of this patent application, are sold by the Italian company Novamont S.p.A. Also the product BioGranic™ 3112 is known and, at the filing date of this patent application, is sold by the Spanish company GCR Group.

Mater-Bi® EF51L, BioGranic™ 3112, Mater-Bi® master MEE and Mater-Bi® DF51A0, as well as the base structure comprising them, are biodegradable and compostable as set forth by Standard EN 13432 of the European Committee for Standardization.

Mater-Bi® EF51L and Mater-Bi® DF51A0 are the predominant components and have a molecular structure resulting from a staged polymerization process which uses the products of the esterification of an alcohol with a dicarboxylic acid, both coming almost completely from the fermentation of starch products such as processing waste from the food industry.

In addition to substantially being permeable to light radiation, the base structure advantageously is thermoshrinking. Said peculiarity, which accordingly also characterizes the film the object of the invention, is particularly appreciated in the field of packaging.

The second additive is present in order to regulate the friction coefficient when the first and the third layers of the base structure are made.

The barrier layer gives the film of the invention an increased barrier effect towards water vapor and atmospheric gases, without precluding the biodegradability and compostability thereof.

If aluminum is present in the barrier layer, it reduces the light-radiation permeability of the film of the invention.

To the knowledge of the Applicant, the film of the invention constitutes an absolute novelty among the known films having an increased barrier effect towards water vapor and atmospheric gases due to the biodegradability and compostability of the film as set forth by Standard EN 13432 of the European Committee for Standardization, and at the same time, the thermo shrinkability thereof.

Other innovative features of the present invention are disclosed in the following description and are referred to in the dependent claims.

According to one aspect of the invention, said barrier layer only comprises aluminum.

Not only does the film of the invention according to this aspect have an increased barrier effect towards water vapor and atmospheric gases, but also towards light radiation. Thus, it may be used to package light-sensitive goods.

According to another aspect of the invention, alternative to the preceding aspect, said barrier layer only comprises aluminum oxide or silicon oxide.

The film of the invention according to this aspect has an increased barrier effect towards water vapor and atmospheric gases and conversely, substantially is permeable to light radiation. Thus, it may be used to package goods which, also if packaged, opportunely should be seen through the packaging by a potential consumer (in order for example, to select or purchase them).

According to another aspect of the invention, said film further comprises:
a biodegradable and compostable adhesive layer as set out by Standard EN 13432 of the European Committee for Standardization,
said adhesive layer, preferably consisting of SunLam™ KR-100/ZB-301, overlapping said barrier layer so that the latter is interposed between said third layer and said adhesive layer,
said adhesive layer having a thickness which is not greater than 2.75 µm, and preferably not greater than 2.5 µm;
a biodegradable and compostable functional layer as set out by Standard EN 13432 of the European Committee for Standardization,
said functional layer, preferably consisting of NATIVIA® NTSS, being a thermoplastic material:
being processable for flexo printing,
comprising polylactic acid,
and
having a density determined according to test ASTM D792 at 23° C., equal to 1.24 g/cm$^3$,
said functional layer overlapping said adhesive layer so that the latter is interposed between said barrier layer and said functional layer,
said functional layer having a thickness between 9 µm and 27.5 µm, and preferably between 10 µm and 25 µm.

So there is no misunderstanding, the product SunLam™ KR-100/ZB-301 is known and, at the filing date of this patent application, is sold by the American company Sun Chemical Corporation. Also the product NATIVIA® NTSS is known and, at the filing date of this patent application, is sold by the company Taghleef Industries with registered office in the United Arab Emirates.

The aforesaid functional layer advantageously may be subjected to printing with biodegradable and compostable inks as set forth by Standard EN 13432 of the European Committee for Standardization, at the face thereof intended to come into contact with said adhesive layer.

By using the film of the invention as packaging according to this aspect, with the first layer of the base structure facing the goods being packaged and the functional layer facing outwards, a print with a so-called "mirror" effect is obtained by printing an image on the functional layer as specified above. This advantageously allows giving the packaging bright, luminous graphics protected from external mechanical actions.

Another object of the invention is the aforesaid base structure, which substantially is permeable to light radiation, for making a biodegradable and compostable film as set out by Standard EN 13432 of the European Committee for Standardization, for packaging perishable goods.

BRIEF DESCRIPTION OF THE DRAWINGS

Further objects and advantages of the present invention will become apparent from the detailed description provided below of example embodiments thereof and from the accompanying drawings merely given by way of a non-limiting example, in which.

DETAILED DESCRIPTION OF SOME PREFERRED EMBODIMENTS OF THE INVENTION

In the continuation of the present description, a figure may also be shown with reference to elements not expressly indicated in that figure but in other figures. The scale and proportions of the different elements depicted do not necessarily correspond to the actual ones.

Figure 1:
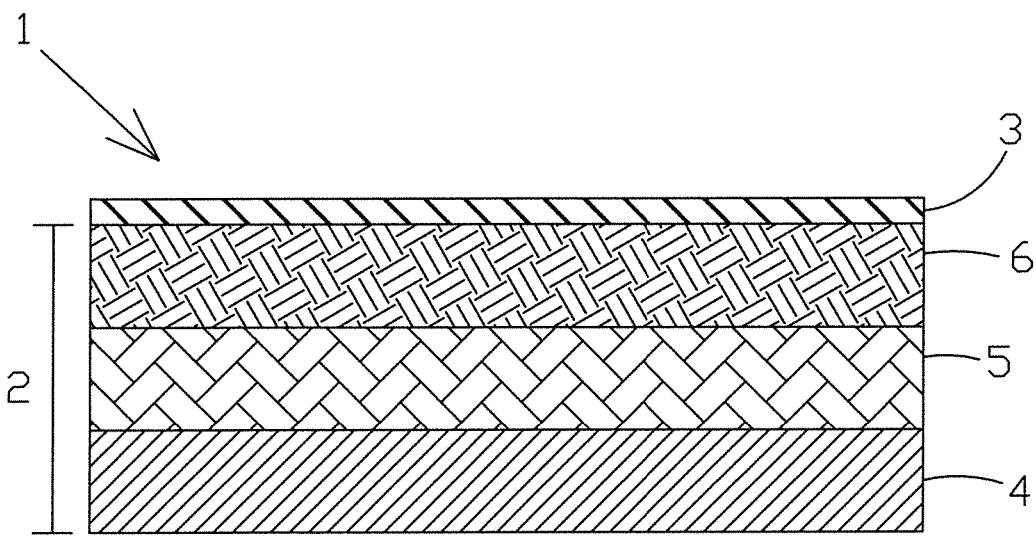
FIG. 1 shows a diagrammatic cross section of a film according to the present invention.

FIG. 1 shows a film 1, object of the invention, which can be used to package perishable goods. Film 1 comprises a "base structure" 2, it also the object of the invention, which substantially is two-dimensional (i.e. with a length and a width which decidedly prevail over the thickness) and on one face of which a layer 3 is applied which can be defined "barrier" given that it gives film 1 an increased barrier effect towards water vapor, atmospheric gases and possibly light radiation.

The base structure 2 substantially is permeable to light radiation and comprises three layers 4, 5 and 6 which overlap one another. The layers 4, 5 and 6 substantially have the same thickness. The thickness of each of the layers 4, 5 and 6 is between 4 μm and 20 μm, preferably between 9 μm and 11 μm, and even more preferably is equal to 10 μm.

Layer 4, identified above with the term "first layer" and intended to come into direct contact with the goods being packaged, consists of a first product which decidedly prevails in weight, and of two additives. Both said first product and both additives are biodegradable and compostable as set out by Standard EN 13432 of the European Committee for Standardization.

The first product, preferably Mater-Bi® EF51L, is a thermoplastic material which is processable by blowing extrusion, comprising polyester, having a density determined according to test ASTM D792 at 23° C., equal to 1.22 g/cm3, and having a melt mass flow index (also called "melt flow rate" or MFR) determined according to Standard ISO 1133-1, equal to 3.5 g/10 min at 190° C. and for 2.16 kg. Said first product is present in layer 4 in a quantity which is not less than 83.5% in weight and preferably equal to 89% in weight.

The first of the two additives mentioned above, preferably BioGranic™ 3112, comprises 67% calcium carbonate in weight and 33% compostable resin in weight as set out by Standard EN 13432 of the European Committee for Standardization. Said first additive has a density of 1.9 g/cm$^3$ and is present in layer 4 in a quantity between 5% in weight and 15% in weight, and preferably equal to 10% in weight.

The second of the two additives mentioned above, preferably Mater-Bi® master MEE, has a melting temperature determined according to test ASTM D3418, equal to 118° C., and a density determined according to test ASTM D792 at 23° C., equal to 1.18 g/cm$^3$. Said second additive is present in layer 4 in a quantity between 0.5% in weight and 1.5% in weight, and preferably equal to 1% in weight.

Layer 5, identified above with the term "second layer", overlaps layer 4 and consists of the aforesaid first product and of a second product.

Said first product is present in layer 5 in a quantity between 40% in weight and 60% in weight, and preferably equal to 50% in weight.

Said second product, preferably Mater-Bi® DF51A0, is a thermoplastic material which is processable by blowing extrusion, comprising polyester, having a density determined according to test ASTM D792 at 23° C., equal to 1.23 g/cm3, and having a melt mass flow index determined according to test ASTM D1238, equal to 4 g/10 min at 190° C. and for 2.16 kg. Said second product is present in layer 5 in a quantity between 40% in weight and 60% in weight, and preferably equal to 50% in weight.

Layer 6, identified above with the term "third layer", overlaps layer 5 and consists of the aforesaid first product and second additive. Namely, said first product is present in layer 6 in a quantity which is not less than 98.5% in weight, and preferably equal to 99% in weight. Said second additive is present in layer 6 in a quantity between 0.5% in weight and 1.5% in weight, and preferably equal to 1% in weight. Incidentally, given that layer 6 overlaps layer 5, the latter is interposed between layers 4 and 6.

The barrier layer 3 overlaps layer 6, has a thickness which is no greater than 0.1 μm and comprises aluminum and/or aluminum oxide and/or silicon oxide. Incidentally, given that the barrier layer 3 overlaps layer 6, the latter is interposed between layer 5 and the barrier layer 3.

Film 1 is biodegradable and compostable as set out by Standard EN 13432 of the European Committee for Standardization. Additionally, the base structure 2, and with it film 1, is thermoshrinking.

If aluminum is present in the barrier layer 3, it reduces the light-radiation permeability of film 1. Specifically, in a first preferred embodiment of film 1, the barrier layer 3 only comprises aluminum. Not only does film 1 according to this embodiment have an increased barrier effect towards water vapor and atmospheric gases, but also towards light radiation. In a second preferred embodiment of film 1, alternative to the preceding embodiment, the barrier layer 3 only comprises aluminum oxide or silicon oxide. Film 1 according to this embodiment has an increased barrier effect towards water vapor and atmospheric gases and conversely, substantially is permeable to light radiation. Film 1 can be made by actuating production processes which substantially are known. Specifically, the base structure 2 preferably can be made by means of a three-layer extrusion process actuated by operating at a temperature which is greater than the melting temperature of the materials used (i.e. of the aforesaid first and second product and first and second additive). The additives preferably are added during the thermoplastic transformation step. The second additive is present in order to regulate the friction coefficient when the layers 4 and 6 are made. If the barrier layer 3 only comprises aluminum, it can be deposited on layer 6 preferably by actuating a lacquering process by vacuum evaporation of aluminum. Similarly, if the barrier layer 3 only comprises aluminum oxide or silicon oxide, it can be deposited on layer 6 preferably by actuating a lacquering process by vacuum evaporation of aluminum oxide or silicon oxide, respectively.

Figure 2:
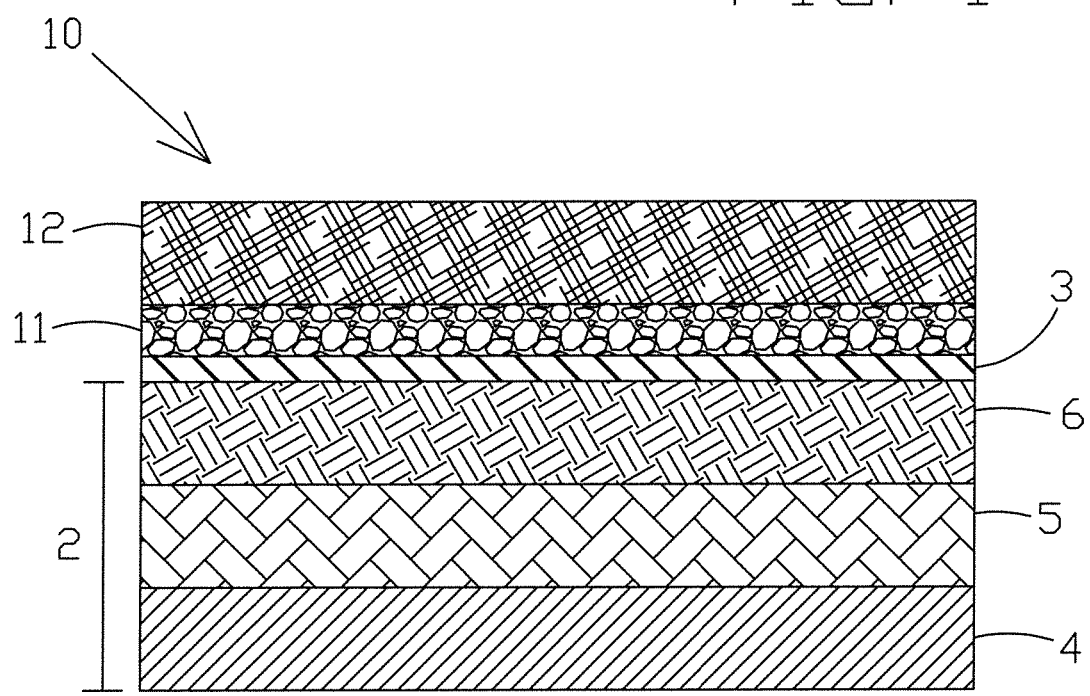
FIG. 2 shows a diagrammatic cross section of a variant of the film in FIG. 1.

FIG. 2 shows a film 10 which is different from film 1 due to the fact that it comprises two further layers 11 and 12 overlapping the barrier layer 3. Specifically, layer 11 is a biodegradable and compostable adhesive layer as set out by Standard EN 13432 of the European Committee for Standardization, and preferably consists of SunLam™ KR-100/ZB-301. Layer 11 overlaps the barrier layer 3 and has a thickness which is not greater than 2.75 μm, and preferably not greater than 2.5 μm.

Layer 12, identified above with the term "functional layer", overlaps layer 11 and, like the latter, is biodegradable and compostable as set out by Standard EN 13432 of the European Committee for Standardization. Layer 12 consists of a thermoplastic material, preferably NATIVIA® NTSS, which is processable for flexo printing, comprising polylactic acid and having a density determined according to test ASTM D792 at 23° C., equal to 1.24 g/cm³. Layer 12 has a thickness between 9 μm and 27.5 μm, and preferably between 10 μm and 25 μm. Incidentally, given that layer 12 overlaps layer 11, the latter is interposed between the barrier layer 3 and layer 12.

Like film 1, the layers 11 and 12 can be made by actuating production processes which substantially are known. Specifically, layer 11 preferably is spreadable over the barrier layer 3 and layer 12 is applicable by lamination on layer 11, possibly after being subjected to printing with biodegradable and compostable inks as set forth by Standard EN 13432 of the European Committee for Standardization, at the face thereof intended to come into contact with layer 11.

So there is no misunderstanding, like film 1, film 10, comprising the base structure 2 and the barrier layer 3, is biodegradable and compostable as set forth by Standard EN 13432 of the European Committee for Standardization, it is thermoshrinking and it has an increased barrier effect towards water vapor, atmospheric gases and possibly light radiation.

On the basis of the description provided for a preferred example embodiment, it is obvious that certain changes can be made by those skilled in the art without departing from the scope of the invention as defined by the following claims.

The invention claimed is:

1. A base structure, which substantially is permeable to light radiation, for making a biodegradable and compostable film as set out by Standard EN 13432 of the European Committee for Standardization, for packaging perishable goods, said base structure comprising:
   a first layer consisting of:
      a first biodegradable and compostable product as set out by Standard EN 13432 of the European Committee for Standardization,
      said first product being a thermoplastic material:
         being processable by blowing extrusion,
         comprising polyester,
         having a density determined according to test ASTM D792 at 23° C., equal to 1.22 g/cm³
         and
         having a melt mass flow index determined according to Standard ISO 1133-1, equal to 3.5 g/10 min at 190° C. and for 2.16 kg,
      said first product being present in said first layer in a quantity which is not less than 83.5% in weight;
      a first biodegradable and compostable additive as set out by Standard EN 13432 of the European Committee for Standardization,
      said first additive comprising 67% calcium carbonate in weight and 33% compostable resin in weight as set out by Standard EN 13432 of the European Committee for Standardization,
      said first additive having a density of 1.9 g/cm³,
      said first additive being present in said first layer in a quantity between 5% in weight and 15% in weight;
      a second biodegradable and compostable additive as set out by Standard EN 13432 of the European Committee for Standardization,
      said second additive having:
         a melting temperature determined according to test ASTM D3418, equal to 118° C. and
         a density determined according to test ASTM D792 at 23° C., equal to 1.18 g/cm³, said second additive being present in said first layer in a quantity between 0.5% in weight and 1.5% in weight,
   said first layer having a thickness between 4 μm and 20 μm;
   a second layer consisting of:
      said first product in a quantity between 40% in weight and 60% in weight;
      a second biodegradable and compostable product as set out by Standard EN 13432 of the European Committee for Standardization,
      said second product being a thermoplastic material:
         being processable by blowing extrusion,
         comprising polyester,
         having a density determined according to test ASTM D792 at 23° C., equal to 1.23 g/cm³
         and
         having a melt mass flow index determined according to ASTM D1238, equal to 4 g/10 min at 190° C. and for 2.16 kg,
      said second product being present in said second layer in a quantity between 40% in weight and 60% in weight,
   said second layer overlapping said first layer and having a thickness which substantially is equal to the one of said first layer;
   a third layer consisting of:
      said first product in a quantity which is not less than 98.5% in weight;
      said second additive in a quantity between 0.5% in weight and 1.5% in weight,
   said third layer overlapping said second layer so that the second layer is interposed between said first and third layers,
   said third layer having a thickness which substantially is equal to the one of said first layer.

2. A base structure according to claim 1, wherein:
   in said first layer:
      said first product is present in a quantity equal to 89% in weight;
      said first additive is present in a quantity equal to 10% in weight;
      said second additive is present in a quantity equal to 1% in weight;
   in said second layer:
      said first product is present in a quantity equal to 50% in weight;
      said second product is present in a quantity equal to 50% in weight;
   in said third layer:
      said first product is present in a quantity equal to 99% in weight;
      said second additive is present in a quantity equal to 1% in weight.

3. A base structure according to claim 1, wherein said first layer has a thickness equal to 10 μm.

4. A film for packaging perishable goods, comprising:
a base structure according to claim 1;
a barrier layer comprising aluminum and/or aluminum oxide and/or silicon oxide,
said barrier layer overlapping said third layer so that the third layer is interposed between said second layer and said barrier layer,
said barrier layer having a thickness which is not greater than 0.1 µm.

5. A film according to claim 4, wherein said barrier layer only comprises aluminum.

6. A film according to claim 4, wherein said barrier layer only comprises aluminum oxide or silicon oxide.

7. A film according to claim 4, further comprising:
a biodegradable and compostable adhesive layer as set out by Standard EN 13432 of the European Committee for Standardization,
said adhesive layer overlapping said barrier layer so that the barrier layer is interposed between said third layer and said adhesive layer,
said adhesive layer having a thickness which is not greater than 2.75 µm;
a biodegradable and compostable functional layer as set out by Standard EN 13432 of the European Committee for Standardization,
said functional layer being a thermoplastic material:
being processable for flexo printing,
comprising polylactic acid,
and
having a density determined according to test ASTM D792 at 23° C., equal to 1.24 g/cm$^3$, said functional layer overlapping said adhesive layer so that the adhesive layer latter is interposed between said barrier layer and said functional layer,
said functional layer having a thickness between 9 µm and 27.5 µm.

8. A film according to claim 7, wherein:
said adhesive layer has a thickness which is not greater than 2.5 µm;
said functional layer has a thickness between 10 µm and 25 µm.

9. A base structure according to claim 2, wherein said first layer has a thickness equal to 10 µm.

10. A film according to claim 5, further comprising:
a biodegradable and compostable adhesive layer as set out by Standard EN 13432 of the European Committee for Standardization,
said adhesive layer overlapping said barrier layer so that the barrier layer is interposed between said third layer and said adhesive layer,
said adhesive layer having a thickness which is not greater than 2.75 µm;
a biodegradable and compostable functional layer as set out by Standard EN 13432 of the European Committee for Standardization,
said functional layer being a thermoplastic material:
being processable for flexo printing,
comprising polylactic acid,
and
having a density determined according to test ASTM D792 at 23° C., equal to 1.24 g/cm$^3$, said functional layer overlapping said adhesive layer so that the adhesive layer is interposed between said barrier layer and said functional layer,
said functional layer having a thickness between 9 µm and 27.5 µm.

11. A film according to claim 6, further comprising:
a biodegradable and compostable adhesive layer as set out by Standard EN 13432 of the European Committee for Standardization,
said adhesive layer overlapping said barrier layer so that the barrier layer is interposed between said third layer and said adhesive layer,
said adhesive layer having a thickness which is not greater than 2.75 µm;
a biodegradable and compostable functional layer as set out by Standard EN 13432 of the European Committee for Standardization,
said functional layer being a thermoplastic material:
being processable for flexo printing,
comprising polylactic acid,
and
having a density determined according to test ASTM D792 at 23° C., equal to 1.24 g/cm$^3$, said functional layer overlapping said adhesive layer so that the adhesive layer is interposed between said barrier layer and said functional layer,
said functional layer having a thickness between 9 µm and 27.5 µm.

12. A film for packaging perishable goods, comprising:
a base structure according to claim 2;
a barrier layer comprising aluminum and/or aluminum oxide and/or silicon oxide,
said barrier layer overlapping said third layer so that the third layer is interposed between said second layer and said barrier layer,
said barrier layer having a thickness which is not greater than 0.1 µm.

13. A film for packaging perishable goods, comprising:
a base structure according to claim 3;
a barrier layer comprising aluminum and/or aluminum oxide and/or silicon oxide,
said barrier layer overlapping said third layer so that the third layer is interposed between said second layer and said barrier layer,
said barrier layer having a thickness which is not greater than 0.1 µm.

* * * * *